(No Model.) 2 Sheets—Sheet 1.

D. CROWLEY.
VELOCIPEDE.

No. 323,640. Patented Aug. 4, 1885.

Witnesses.
E. Planta
W. Simmons

Inventor.
D. Crowley
by J. H. Adams
Attorney.

N. PETERS, Photo-Lithographer, Washington, D. C.

(No Model.)  2 Sheets—Sheet 2.

D. CROWLEY.
VELOCIPEDE.

No. 323,640.  Patented Aug. 4, 1885.

Witnesses.  Inventor
E. Planta  D. Crowley
W. Simmons  by J. H. Adams
  Attorney.

UNITED STATES PATENT OFFICE.

DANIEL CROWLEY, OF BOSTON, MASSACHUSETTS.

VELOCIPEDE.

SPECIFICATION forming part of Letters Patent No. 323,640, dated August 4, 1885.

Application filed October 20, 1884. (No model.)

*To all whom it may concern:*

Be it known that I, DANIEL CROWLEY, a citizen of the United States, residing at Boston, in the county of Suffolk and State of Massachusetts, have invented certain new and useful Improvements in Velocipedes, of which the following is a specification.

My invention relates to certain improvements in velocipedes, whereby they are enabled to be propelled by the hands or by the feet, or by both the hands and the feet at the same time; and it consists in so constructing the frame and its connections that a forward or steering wheel can be caused to travel upon the ground, or be raised and held in an elevated position, according as the vehicle is propelled by the feet or the hands, or by both at the same time.

The invention further consists in certain details of construction hereinafter fully described.

Figure 5:
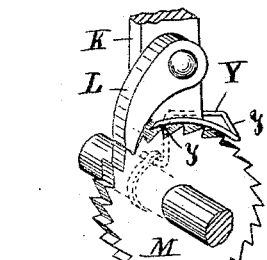
Figure 2:
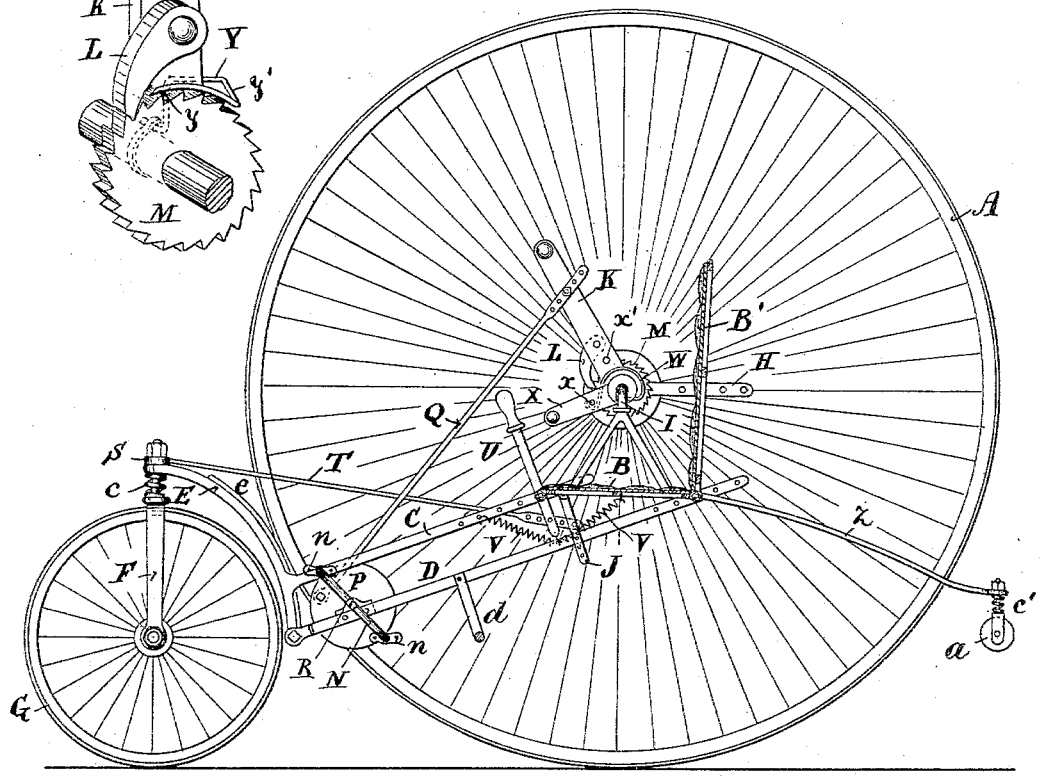
Figure 1:
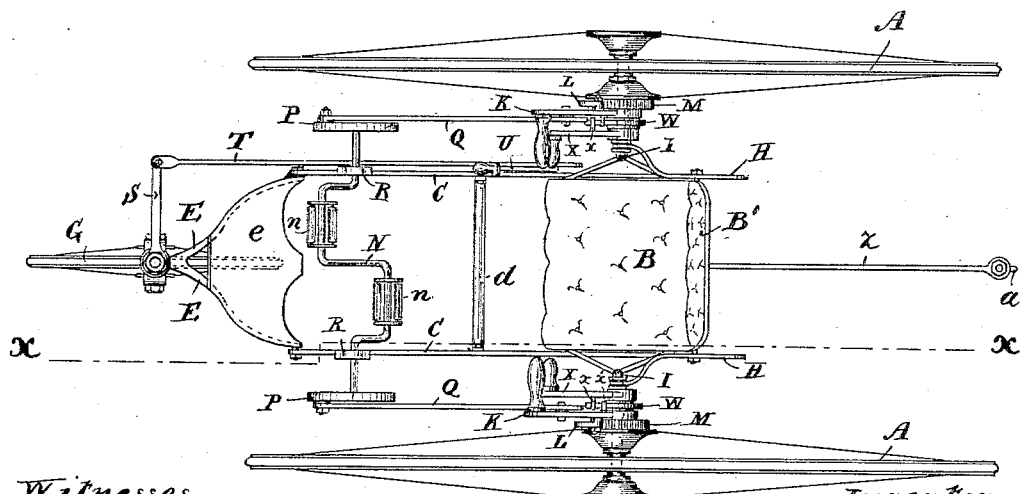
Figure 3:
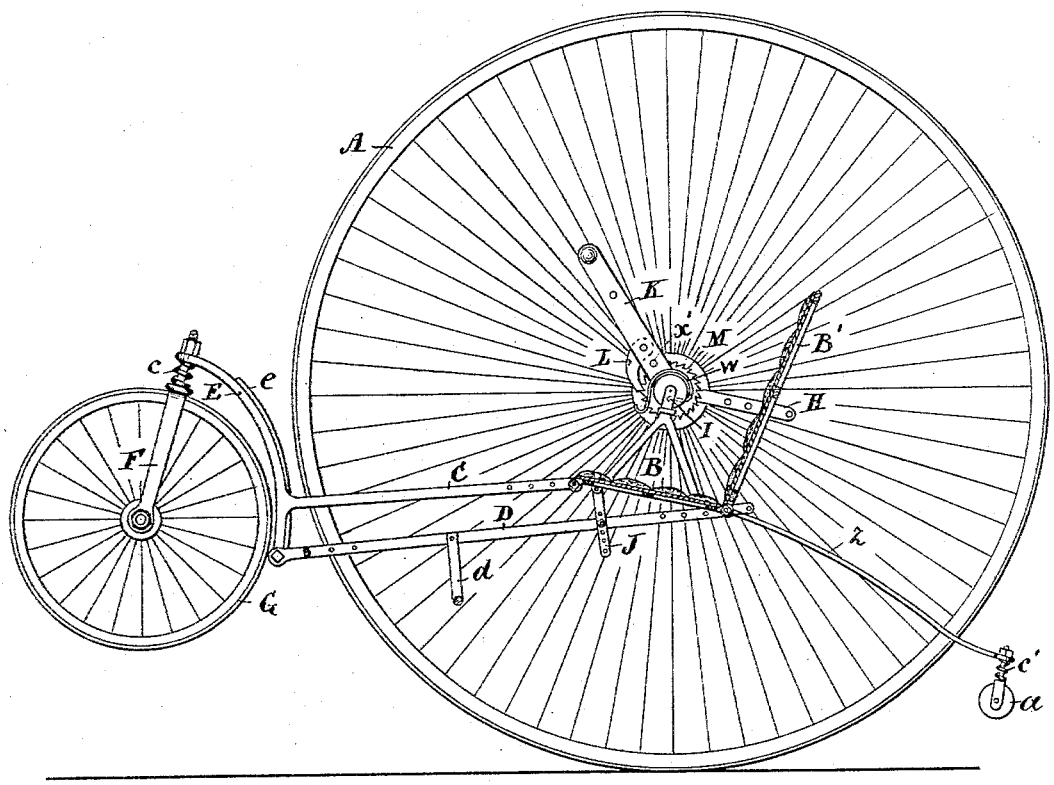
Figure 4:
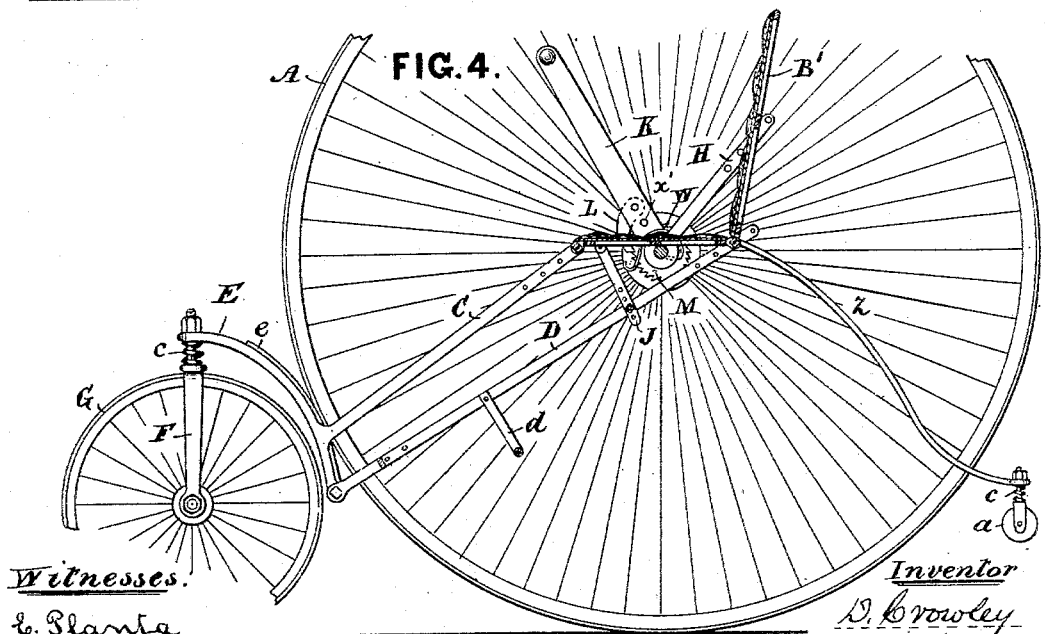

Referring to the accompanying drawings, Figure 1 represents a plan or top view of a velocipede embodying my invention. Fig. 2 is a vertical longitudinal section on the line $x$ $x$ of Fig. 1. Fig. 3 is a similar section with some of the parts removed. Fig. 4 is also a similar section to Fig. 2, showing a change in the position of the seat, and Fig. 5 is a detail view of the pawl-and-ratchet wheel.

A A are the main or driving wheels between which is supported a seat, B. To the seat B are attached on each side bars C D, which extend forward and carry at their front ends a forked frame, E, to which latter is connected at its forward end a bifurcated frame or standard, F, connected at its ends with the axle of a small wheel, G, as shown.

The bars C C are rigid with the forked frame E, and are connected with the seat B by means of bolts passing through eyes in the seat, and through one of a series of holes in the bars C C. The forward ends of the bars D D are pivoted to the lower part of the forked frame E, and are provided with holes and connected to the rear of the seat B in a manner similar to the bars C.

On the under side of the seat B, at the front part and on each side, is pivoted or hinged a short bar, J, having a series of holes, and secured to the bars D by means of bolts and nuts for the purpose of maintaining the bars C and D and the seat B in their proper relative positions after being once adjusted.

The bars C and D are capable of being adjusted so as to accommodate the vehicle to riders of different sizes, and to adjust the seat to any required inclination, and also to cause the wheel G to be raised from the ground and held in an elevated position when desired, as shown in Fig. 3. Two steering-wheels may be employed, one on each side of frame F.

To the rear of the seat B is hinged a back, B', which is held in position by means of bars H H secured to the axle I or to the seat B. Bolts connected to the back are passed through one of a series of holes in the bars H H to adjust the inclination of the back.

The propelling mechanism consists of a lever, K, loosely connected to the hub of each driving-wheel A, or it may be connected with the axle. To the lever K is connected a pawl, L, which engages with a ratchet-wheel, M, secured to the hubs of the wheels A. The levers K are operated by hand, or motion may be transmitted to them by means of rods Q, having a series of holes at their upper ends, by which they are adjustably connected to the levers K and connected at their lower ends to pins on the disks P at the ends of a crank-shaft, N, which latter is operated by the feet. By the adjustment of the rods Q the length of the machine may be varied according to circumstances, and the length of stroke provided for according to the speed at which it may be desired to propel the vehicle.

The crank-shaft N is supported in bearings R, secured to the bars D in such a way as to be readily detached and removed when the vehicle is to be driven by the hands alone. The shaft N is provided with pedals $n$.

To the upper end of the frame F is secured an arm, S, pivoted to a rod or bar, T, which extends to the rear, and is connected to a hand-lever, U, carried by the same bolt that secures the bar C to the seat B. The bar T is provided with a series of holes, by means of which it can be adjustably attached to the lever U. By moving the lever U forward or back the wheel G will be turned to guide the vehicle to the right or left, as desired. Attached to the lower end of the lever U and to the bar C, and also to the seat B, are springs V V, for the purpose of holding the lever U in position when the vehicle is running directly forward.

The brake is composed of a flat strip of metal, W, bend around the hub and secured at one end to the axle I, the other end being turned upward so as to engage with a pin, $x$, on an auxiliary lever, X, loosely secured to the hub of the wheel A. On the outer end of the lever X is a handle, by pressing upon which the pin $x$ will cause the free end of the brake to be depressed and forced upon the hub of the wheel A, and thus check the speed of the vehicle.

On the lever K is also a pin, $x'$, so that when the machine is driven by hand and it is desired to apply the brake, it is only necessary to depress the lever K, and the pin $x'$ will come in contact with the pin $x$, and the brake W will be forced down upon the hub of the wheel. The lever X may be removed, and then the pin $x'$ will come in direct contact with the brake.

In Fig. 5 is shown a device for preventing the lever K from being thrown too far back and also for raising the pawl out of contact with the ratchet-wheel M, and it consists of a bent rod, Y, one end of which is secured to the axle. It is then bent upward, backward, and around the lever K, and then bent over the upper part of the ratchet-wheel M, as shown, so that when the pawl L comes in contact with the end $y$ it will be raised up and ride over the rod Y, and when the back of the lever K comes in contact with the rear portion, $y'$, the said lever will be prevented from going farther back.

To the rear of the seat B is secured a rod or bar, $z$, on the rear or outer end of which is a small wheel, $a$, for the purpose of preventing the seat from tipping too far back.

Surrounding the bolt on the upper part of the frame F is a spiral spring, $c$, bearing upon the said frame and supporting the forward end of the forked frame E, for the purpose of providing an elastic bearing for the said frame and preventing or lessening any jar occasioned by traveling over uneven ground.

A similar spring, $c'$ is placed upon the bolt that carries the rear wheel, $a$.

$d$ is a foot-rest attached crosswise to the bars D D, and $e$ is a dash-board secured to the forked frame E.

It will be seen that by means of the arrangement of parts as described and shown in Figs. 1 and 2, that the velocipede can be propelled by the feet alone or by the hands alone, or by both hands and feet together. By removing the crank-shaft N, rod Q, arm S, rod T, lever U, and springs W, the velocipede is capable of being propelled by the hands alone.

In Fig. 4 the seat is shown as arranged upon or above the axle instead of below the same, as in Figs. 1 and 3.

In velocipedes of small size, and for greater simplicity, the crank-bar may be fastened to the bars C C, and the bars D D omitted. In this case the ends of the bars C C are attached to the back of the seat, and the rods J J are then attached to the bars C C, so as to give any desired inclination to the seat, and at the same time hold it in position.

What I claim as my invention is—

1. In a velocipede having two side wheels, A A, and a seat supported between the same, the combination of the bars C C D D, frames E and F, and the wheel G, as and for the purpose set forth.

2. In a velocipede having two side wheels, A A, and a seat supported between the same, the combination of the wheel G, the bifurcated frame F, connected to the axle of wheel G, the arm S, the adjustable rod T, the lever U, and seat B, all arranged to operate as and for the purpose set forth.

3. The springs V V, in combination with the lever U, bars C and D, and seat B, as and for the purpose specified.

4. The combination of the crank-shaft N, disks P P, adjustable rods Q Q, and lever K, as and for the purpose set forth.

5. The combination, with the seat B, of the adjusting-bars J J, and the bars C C D D, as shown and described.

6. The combination, with the seat B, of the adjustable bars C C and D D, for adjusting the position of the seat, substantially as shown and described.

7. The combination, with the seat B, of the adjustable back B', and the adjusting-bars H H, as shown and described.

8. The auxiliary lever X, provided with a pin, $x$, and a handle in combination with the brake W, as shown and described.

9. The bent rod Y, in combination with the lever K, pawl L, and ratchet-wheel M, as and for the purpose set forth.

10. The combination, with the hub of the wheel A, of the lever K, the pawl L, and the stopping device Y, as and for the purpose specified.

11. In combination with the seat of a velocipede, the bars C C, bars J J, crank-axle N, forked frame E, frame F, and wheel G.

In testimony whereof I have signed my name to this specification in the presence of two subscribing witnesses.

DANIEL CROWLEY.

Witnesses:
   J. H. ADAMS,
   E. PLANTA.